US008828107B2

(12) United States Patent
Key et al.

(10) Patent No.: US 8,828,107 B2
(45) Date of Patent: Sep. 9, 2014

(54) PROCESS AND APPARATUS FOR SYNTHESIS GAS HEAT EXCHANGE SYSTEM

(75) Inventors: Ronald Dean Key, Broken Arrow, OK (US); Maqsudur Rahman Khan, Broken Arrow, OK (US)

(73) Assignee: Linde Process Plants, Inc., Tulsa, OK (US)

(*) Notice: Subject to any disclaimer, the term of this patent is extended or adjusted under 35 U.S.C. 154(b) by 909 days.

(21) Appl. No.: 13/006,712

(22) Filed: Jan. 14, 2011

(65) Prior Publication Data
US 2012/0018126 A1    Jan. 26, 2012

Related U.S. Application Data

(63) Continuation-in-part of application No. 11/342,705, filed on Jan. 31, 2006, now Pat. No. 7,871,449.

(51) Int. Cl.
| | | |
|---|---|---|
| B01J 7/00 | (2006.01) | |
| C01B 3/36 | (2006.01) | |
| C01B 3/34 | (2006.01) | |
| F28D 7/00 | (2006.01) | |
| F28D 21/00 | (2006.01) | |

(52) U.S. Cl.
CPC ... C01B 3/34 (2013.01); C01B 3/36 (2013.01); C01B 2203/0833 (2013.01); F28D 7/0066 (2013.01); F28D 2021/0022 (2013.01); F28D 21/001 (2013.01); C01B 2203/0844 (2013.01); C01B 2203/0883 (2013.01)
USPC ............................................................. 48/61

(58) Field of Classification Search
CPC ...... F28D 7/0066; F28D 7/0083; F28D 7/022; F28D 9/0093; F28D 7/0075
See application file for complete search history.

(56) References Cited

U.S. PATENT DOCUMENTS

| | | |
|---|---|---|
| 2,819,882 A | 1/1958 | Stephani |
| 3,277,958 A | 10/1966 | Taylor |
| 3,294,161 A | 12/1966 | Wood |
| 3,716,045 A | 2/1973 | Vollhardt |
| 4,059,882 A | 11/1977 | Wunder |
| 4,102,659 A | 7/1978 | Martin |
| 4,113,441 A | 9/1978 | Suzuki et al. |
| 4,327,802 A * | 5/1982 | Beldam .................. 165/153 |
| 4,344,482 A | 8/1982 | Dietzsch |
| 4,352,675 A | 10/1982 | Seipenbusch et al. |
| 4,377,132 A | 3/1983 | Koog et al. |
| 4,462,463 A | 7/1984 | Gorham, Jr. |
| 4,546,818 A | 10/1985 | Nussbaum |
| 4,566,880 A | 1/1986 | Seipenbusch et al. |
| 4,781,241 A | 11/1988 | Misage et al. |
| 4,999,029 A | 3/1991 | Lueth et al. |
| 5,046,548 A | 9/1991 | Tilly |
| 5,246,063 A | 9/1993 | Fix et al. |
| 5,419,392 A | 5/1995 | Maruyama |
| 5,689,971 A | 11/1997 | Kuhlenschmidt et al. |
| 5,755,280 A | 5/1998 | da Costa et al. |

(Continued)

FOREIGN PATENT DOCUMENTS

| | | |
|---|---|---|
| EP | 0 578 218 A2 | 1/1994 |
| GB | 2 187 751 A | 9/1987 |

*Primary Examiner* — Imran Akram
(74) *Attorney, Agent, or Firm* — Philip H. Von Neida (57) ABSTRACT

The invention provides an improved process and apparatus for integrating the heat transfer zones of spiral-wound, plate fin, tube and finned tube exchangers thus increasing the overall effectiveness of the process.

27 Claims, 5 Drawing Sheets

Preferred Embodiment Employing
Partitioned (Two Compartment) Vessel

(56) References Cited

U.S. PATENT DOCUMENTS

| | | | |
|---|---|---|---|
| 5,856,585 A | 1/1999 | Sanfilippo et al. | |
| 5,964,280 A | 10/1999 | Wehrmann et al. | |
| 6,051,195 A | 4/2000 | Deeke et al. | |
| 6,095,240 A | 8/2000 | Hassanein et al. | |
| 6,103,118 A * | 8/2000 | Ter Meulen | 210/321.79 |
| 6,276,442 B1 | 8/2001 | Rasmussen | |
| 6,730,285 B2 | 5/2004 | Aasberg-Petersen et al. | |
| 6,749,829 B2 | 6/2004 | Briscoe | |
| 2004/0031592 A1* | 2/2004 | Mathias et al. | 165/104.19 |
| 2004/0101727 A1* | 5/2004 | Okazaki et al. | 429/26 |
| 2005/0092472 A1 | 5/2005 | Lewis | |
| 2005/0103484 A1 | 5/2005 | Komatsu et al. | |
| 2005/0236145 A1 | 10/2005 | Arai et al. | |
| 2006/0180703 A1 | 8/2006 | Zeilinski et al. | |
| 2006/0199051 A1 | 9/2006 | Bai et al. | |
| 2007/0000176 A1 | 1/2007 | Liu et al. | |

\* cited by examiner

Figure 1
Prior Art

Figure 2
Preferred Embodiment Employing
Partitioned (Two Compartment) Vessel

Figure 3
Alternate Embodiment Employing
External Secondary Cooling and Separation Figure 4
Alternate Embodiment Employing
Only External Air Cooling Utility Figure 5
Alternate Embodiment Employing
Only Cooling Water Utility

US 8,828,107 B2

PROCESS AND APPARATUS FOR SYNTHESIS GAS HEAT EXCHANGE SYSTEM

CROSS REFERENCE TO RELATED APPLICATIONS

This application is a continuation in part of U.S. patent application Ser. No. 11/342,705, filed Jan. 31, 2006.

BACKGROUND OF THE INVENTION

This invention relates to an improved process for cooling hydrogen-bearing synthesis gas via heat exchange and specifically to a more efficient design of heat exchangers for hydrogen-bearing synthesis gas cooling.

Hydrogen-bearing synthesis gas streams are generally produced from steam/hydrocarbon reforming (often referred as steam/methane reforming), coal gasification and partial oxidation processes. See, e.g., U.S. Pat. No. 4,113,441 (steam reforming of hydrocarbons); U.S. Pat. No. 4,352,675 (partial oxidation of coal), U.S. Pat. No. 4,566,880 (partial oxidation of coal); U.S. Pat. No. 4,999,029 (partial oxidation of liquid and/or solid fuels); U.S. Pat. No. 5,856,585 (partial oxidation of natural gas); U.S. Pat. No. 6,730,285 (partial oxidation of hydrocarbon feed); and U.S. Pat. No. 6,749,829 (steam reforming of natural gas).

Traditionally, the hydrogen-bearing synthesis gas product streams obtained from these processes have been cooled in shell and tube heat exchangers. See, for example, Fix et al., U.S. Pat. No. 5,246,063, which discloses a heat exchanger for cooling synthesis gas generated from a coal-gasification plant. The heat exchanger contains a plurality of heat exchange pipes which are surrounded by a jacket. The pipes communicate at one end with a gas-intake chamber, and at their other end with a gas-outtake chamber. Synthesis gas from a coal-gasification plant enters the gas-intake chamber, passes through the pipes, and then enters the gas-outtake chamber. While passing through the pipes, the synthesis gas is cooled by water introduced into the jacket. The water is vaporized into steam which is then removed from the jacket.

Koog et al., U.S. Pat. No. 4,377,132, discloses another type of shell and tube heat exchanger for cooling synthesis gas. This synthesis gas cooler has two concentric so called "water walls" within an outer shell. The water walls are each formed from a plurality of parallel tubes joined together by connecting fins to form a gas tight wall. Water flows within the tubes and is vaporized into steam. The synthesis gas flows on the outside of the tubes, first axially and then through the annular region formed between the two concentric water walls.

Oecke et al., U.S. Pat. No. 6,051,195, discloses a more complicated synthesis gas cooling system comprising a radiant synthesis gas cooler, and two convective synthesis gas coolers both which include a water-cooling structure to provide heat-exchange via cooling water flowing in counterflow.

Plate-fin heat exchangers and tube heat exchangers, spiral-wound or externally finned, have long been employed to recover process heat. These exchangers are often employed to heat or cool a low-density gas stream located on the external (often formed) side against a higher density stream with higher heat transfer coefficient within the plates or tubes. The extended surface of the finned exterior pass allows (1) greater heat transfer surface than a bare tube or plate and (2) provides greater heat transfer at a correspondingly lower pressure drop than would be experienced with bare tubes or plates.

Heat exchangers having more than one fluid circulating through separate tube passes are known. Published US Application No. 200510092472 (Lewis) discloses a plate fin and tube or finned tube type heat exchanger wherein a first working fluid is made to flow on the exterior of finned tubes, and two or more additional working fluids are made to flow in separate tube circuits within the heat exchanger. In an Example, U.S. Pat. No. '472 describes an embodiment wherein the first working fluid flows over the finned exterior side and three additional working fluids flow within separate tube circuits within the heat exchanger. The first working fluid is a mixture of $N_2$ and $H_2O$. The second working fluid is, for example, natural gas. The third working fluid is water, and the fourth working fluid is also water.

See also Misage et al. (U.S. Pat. No. 4,781,241) which describes a heat exchanger for use with a fuel cell power plant. In the exchanger, reformer effluent passes over the exterior of tubes. The latter provide for the circulation of three different fluids, i.e., water, steam, and hydrocarbon fuel to be preheated. See, also, U.S. Pat. No. 3,277,958 (Taylor et al.), U.S. Pat. No. 3,294,161 (Wood), U.S. Pat. No. 4,546,818 (Nussbaum), U.S. Pat. No. 4,344,482 (Dietzsch), and U.S. Pat. No. 5,419,392 (Maruyama).

The prior art process of cooling the hydrogen-bearing synthesis gas stream is heat exchange via separate, individual heat exchangers. In each of these separate heat exchangers, the synthesis gas is cooled to the desired outlet temperature by heat exchange with a single process stream, such as the feed hydrocarbon stream, boiler feed water, demineralized water, ambient air and/or cooling water. This practice of cooling hydrogen-bearing synthesis gas in one or more shell and tube heat exchangers, with each heat exchanger using a single cooling medium, is relatively inefficient. Recent changes in the cost of the feedstock material combined with ever increasing economic pressure have created a demand for a more efficient and less costly process and apparatus to accomplish synthesis gas production, including more efficient and less costly procedures for cooling synthesis gas by heat exchange.

SUMMARY OF THE INVENTION

The invention provides a process and apparatus for enhancing the efficiency of the cooling of hydrogen-bearing synthesis gas. The invention also provides, by the use of such cooling, reduced energy consumption than the prior art.

The invention seeks to achieve cooling of hydrogen-bearing synthesis gas through integrating multiple process fluids into a single side of one or more heat exchangers and integrating the heat transfer zones of the multiple fluids to allow more effective heat transfer.

Thus, generally, the invention provides a system for more efficient heat transfer in, for example, a plate-fin, plate fin and tube or finned tube exchanger for cooling a gas stream, preferably a hydrogen-bearing synthesis gas stream. In a preferred embodiment, the invention further provides for continuous separation of the gaseous phase of the synthesis gas from a liquid phase condensed during cooling of the hydrogen-bearing synthesis gas stream.

In accordance with the invention there is provided a process for recovering energy from a hydrogen-bearing synthesis gas stream comprising:

a. providing a first heat exchanger having at least four separate flow circuits;

b. supplying a first hot hydrogen-bearing synthesis gas stream (e.g., obtained from a steam/hydrocarbon reforming process, a coal gasification process or a partial oxidation process) to a first flow circuit of said first heat exchanger;

c. supplying a first cool heat exchange medium (e.g., a hydrocarbon feed) to a second flow circuit of said first heat exchanger whereby said hot hydrogen-bearing synthesis gas stream is cooled by indirect heat exchange with said first cool heat exchange medium;

d. feeding a second cool heat exchange medium (e.g., boiler water) to a third flow circuit of said first heat exchanger whereby said hot hydrogen-bearing synthesis gas stream is cooled by indirect heat exchange with said second cool heat exchange medium;

e. feeding a third cool heat exchange medium (e.g., demineralized water) to a fourth flow circuit of said first heat exchanger whereby said hot hydrogen-bearing synthesis gas stream is cooled by indirect heat exchange with said third cool heat exchange medium; and f. removing cooled hydrogen-bearing synthesis gas stream from said heat exchanger.

In accordance with a further aspect of the invention, the process further comprises: feeding a fourth cool heat exchange medium (e.g., cooling water) to a fifth flow circuit of said first heat exchanger whereby said hot hydrogen-bearing synthesis gas stream is cooled by indirect heat exchange with said fourth cool heat exchange medium.

In accordance with an apparatus aspect of the invention there is provided a heat exchange apparatus (such as a spiral-wound tube heat exchanger, a plate-fin heat exchanger or a shell-tube heat exchanger) for cooling a hydrogen-bearing synthesis gas, said heat exchanger comprising:

a. means for defining at least four separate flow circuits within said heat exchanger whereby the first flow circuit is in indirect heat exchange with the second flow circuit, the third flow circuit, and the fourth flow circuit;

b. a first inlet for introducing hot hydrogen-bearing synthesis gas into the means defining said first circuit of said heat exchanger, and a first outlet for discharging cooled hydrogen-bearing synthesis gas from said means defining said first circuit of said heat exchanger;

c. a source of hot hydrogen-bearing synthesis gas in fluid communication with said first inlet;

d. a second inlet for introducing a cool first heat exchange medium into means defining said second circuit of said heat exchanger, and a second outlet for discharging said first heat exchange medium from said means defining said second circuit of said heat exchanger;

e. a source of cool first heat exchange medium (e.g., a hydrocarbon stream such as natural gas used as the feed for the source of hot hydrogen-bearing synthesis gas such as a steam reformer) in fluid communication with said second inlet;

f. a third inlet for introducing a cool second heat exchange medium into means defining said third circuit of said heat exchanger, and a third outlet for discharging said cool second heat exchange medium from said means defining said third circuit of said heat exchanger; and g. a source of cool second heat exchange medium (e.g., boiler feed water) in fluid communication with said third inlet;

h. a fourth inlet for introducing a cool third heat exchange medium into means defining said fourth circuit of said heat exchanger, and a fourth outlet for discharging said cool third heat exchange medium from said means defining said fourth circuit of said heat exchanger; and i. a source of cool third heat exchange medium (e.g., demineralized water) in fluid communication with said fourth inlet.

In accordance with a further aspect of the invention, the apparatus further comprises:

means for defining a fifth separate flow circuit within said heat exchanger whereby the first flow circuit is in indirect heat exchange with the fifth flow circuit;

a fifth inlet for introducing a cool fourth heat exchange medium into means defining said fifth circuit of said heat exchanger, and a fifth outlet for discharging said cool fourth heat exchange medium from said means defining said fifth circuit of said heat exchanger; and a source of cool fourth heat exchange medium in fluid communication with said fifth inlet.

In another embodiment of the invention, there is disclosed a process for recovering energy from a hydrogen-bearing synthesis gas stream comprising:

a. providing a first heat exchanger having at least four separate flow circuits;

b. supplying a first hot hydrogen-bearing synthesis gas stream to a first flow circuit of said first heat exchanger;

c. supplying a first cool heat exchange medium to a second flow circuit of said first heat exchanger whereby said hot hydrogen-bearing synthesis gas stream is cooled by indirect heat exchange with said first cool heat exchange medium;

d. feeding a second cool heat exchange medium to a third flow circuit of said first heat exchanger whereby said hot hydrogen-bearing synthesis gas stream is cooled by indirect heat exchange with said second cool heat exchange medium;

e. feeding a third cool heat exchange medium to a fourth flow circuit of said first heat exchanger whereby said hot hydrogen-bearing synthesis gas stream is cooled by indirect heat exchange with said third cool heat exchange medium; and f. removing cooled hydrogen-bearing synthesis gas stream from said heat exchanger;

wherein said first heat exchanger is divided into at least a first section and a second section; indirect heat exchange between the hot hydrogen-bearing synthesis gas stream and the second cool heat exchange medium is performed only in said first section of said first heat exchanger and indirect heat exchange between the hot hydrogen-bearing synthesis gas stream and the third cool heat exchange medium is performed only in said first section of said first heat exchanger and indirect heat exchange between the hot hydrogen-bearing synthesis gas stream and the first cool heat exchange medium is performed in both the first section and the second section of said first heat exchanger.

There is further disclosed a process for recovering energy from a hydrogen-bearing synthesis gas stream comprising:

a. providing a first heat exchanger having at least four separate flow circuits;

b. supplying a first hot hydrogen-bearing synthesis gas stream to a first flow circuit of said first heat exchanger;

c. supplying a first cool heat exchange medium to a second flow circuit of said first heat exchanger whereby said hot hydrogen-bearing synthesis gas stream is cooled by indirect heat exchange with said first cool heat exchange medium;

d. feeding a second cool, heat exchange medium to a third flow circuit of said first heat exchanger whereby said hot hydrogen-bearing synthesis gas stream is cooled by indirect heat exchange with said second cool heat exchange medium;

e. feeding a third cool heat exchange medium to a fourth flow circuit of said first heat exchanger whereby said hot hydrogen-bearing synthesis gas stream is cooled by indirect heat exchange with said third cool heat exchange medium; and f. removing cooled hydrogen-bearing synthesis gas stream from said heat exchanger; wherein said first heat exchanger is divided into at least a first section and a second section and said process further comprising removing condensate, formed during the cooling of said first hot hydrogen-bearing synthesis gas stream, from said first section and said second section.

In addition to the main heat exchanger described above the heat recovery process and heat exchange apparatus according to the invention may further comprise a second heat exchanger. For example, at least a portion of the hot hydrogen-bearing synthesis may be removed from the first heat exchanger and subjected to heat exchange (e.g., heat exchange with ambient air) in a second heat exchanger. At least a portion of the resultant cooled hydrogen-bearing synthesis can then be returned to the first heat exchanger for further cooling by indirect heat exchange.

As noted above, typically the main heat exchanger used in the overall cooling system can be a spiral-wound tube heat exchanger, a plate-fin heat exchanger, or a shell tube heat exchanger. However, the main heat exchanger can be any heat exchanger that provides for indirect heat exchange between at least one fluid which is to be cooled and a plurality of separate fluids that are to each be heated. Preferably, the main heat exchanger is a shell-tube heat exchanger in which the tubes are straight or intertwined (e.g., a spiral wound shell-tube heat exchanger). The means defining each of the circuits can be, for example, a passageway (such as the passageway defined by an outer shell that surrounds several plates defining the other circuits, or the shell side of a shell and tube heat exchanger), a single tube, or a plurality of tubes.

The fluid to be cooled, e.g., the hot hydrogen-bearing synthesis gas, can undergo indirect heat exchange with more than one heat exchange medium at the same time. For example, the hot hydrogen-bearing synthesis gas flowing in the first circuit can undergo indirect heat exchange with demineralized water flowing through the second circuit while simultaneously undergoing indirect heat exchange with a hydrocarbon feed stream flowing in a separate circuit, e.g., the third circuit. By this procedure, multiple circuits can be integrated to more effectively allow the composite heating curve of multiple cooling streams to thermally approach the cooling curve of the hot working stream. Such a procedure permits a more effective heat transfer by allowing a closer temperature approach between the hydrogen-bearing synthesis gas being cooled and the multiple cooling streams that are being heated.

According to a further aspect of the invention, the first or main heat exchanger is divided into at least a first section and a second section. For example, in the first section, indirect heat exchange is performed between the hot hydrogen-bearing synthesis gas stream and the second cool heat exchange medium, and between the hot hydrogen-bearing synthesis gas stream and the third cool heat exchange medium. However, indirect heat exchange between the hot hydrogen-bearing synthesis gas stream and the first cool heat exchange medium is performed, for example, in both the first section and the second section. Additionally, heat exchange between the hot hydrogen-bearing synthesis gas stream and the fourth cool heat exchange medium can also be performed in the second section. See, e.g., FIGS. 2 and 4.

According to a further alternative, all or a portion of the hydrogen-bearing synthesis gas stream is removed from the first section of the first heat exchanger, subjected to heat exchange in second heat exchanger (e.g., an external air-cooled exchanger), and introduced into a gas/liquid separator. The uncondensed portion of the hydrogen-bearing synthesis gas stream is then removed from the gas/liquid separator and introduced into the second section of the first heat exchanger.

In another embodiment of the invention, the circuits that define the cooling portions of the heat exchanger can be intertwined, alternated sequentially or in a pattern or overlapped such that heat is exchanged in parallel with two (2) cool streams simultaneously rather than the circuits laying in series with each other. This configuration of the cooling portions of the heat exchanger will improve the energy efficiency in removing heat from the hot streams.

As noted above, the process may further comprise performing indirect heat exchange between the hot hydrogen-bearing synthesis gas stream and a fifth cool heat exchange medium. This further heat exchange need not, however, be performed in the same heat exchanger. Thus, the indirect heat exchange between the hot hydrogen-bearing synthesis gas stream and the fifth cool heat exchange medium can be performed in a second heat exchanger.

Alternatively, the indirect heat exchange between the hot hydrogen-bearing synthesis gas stream and the fourth cool heat exchange medium can be performed in the second section of the first heat exchanger. In accordance with a further aspect of the invention, the hydrogen-bearing synthesis gas stream is removed from the first heat exchanger, subjected to heat exchange in an external air-cooled exchanger, introduced into a first gas/liquid separator, and the uncondensed portion of the hydrogen-bearing synthesis gas stream is removed from the first gas/liquid separator and introduced into a second heat exchanger and then delivered to a second gas/liquid separator, from which cooled product hydrogen-bearing synthesis gas is removed.

Although it can be applied to the cooling of other process gases, as mentioned above, the invention is preferably directed to the cooling of hydrogen-synthesis gas. Sources of hydrogen-synthesis gas include such processes as steam hydrocarbon reforming, coal gasification and partial oxidation processes. Typically, a hydrogen-bearing synthesis gas contains, for example, 35-75 mol % $H_2$, 0-2 mol % $N_2$, 2-45 mol % CO, 12-40 mol % $CO_2$, 0-10 mol % $H_2S$, and less than 3 mol % $C_{2+}$ hydrocarbons. Examples of the compositions of synthesis gas from various sources are listed in the following table:

| Typical Composition of Synthesis Gas from Various Sources | | |
| --- | --- | --- |
| Component, Mol Percent | Steam-Methane Reforming | Gasification of Coal and Heavy Hydrocarbons |
| Hydrogen | 54-75 | 35-45 |
| Nitrogen | 0-2 | 0-1 |
| Argon | 0-0.1 | 0-0.6 |
| Carbon Monoxide | 2-4 | 15-45 |
| Carbon Dioxide | 12-16 | 15-40 (e.g., 15-32) |
| Water | Saturated | Saturated |
| Methane | 4-7 | 0-11 |
| Hydrogen Sulfide | Nil | 0-10 (e.g., 0-5) |

In general, the above-mentioned synthesis gas production processes provide a hydrogen-bearing synthesis gas at a temperature of, for example, 250 to 450° C. For purposes of hydrogen recovery or further processing into feedstock for chemical production, it is desirable to cool this stream of hydrogen-bearing synthesis gas by the process/apparatus of the invention to a temperature of, for example, 30 to 50° C.

The heat exchange mediums typically used in the invention include the feed stream used in the process that generates the hydrogen-bearing synthesis gas (e.g., a hydrocarbon stream), boiler feed water, demineralized water, ambient air and cooling water. Other possible heat exchange mediums include solvents, such as when removal of the carbon dioxide is required, and other possible streams as necessary to enhance the overall efficiency of the process.

The entire disclosures of all applications, patents and publications, cited above and below, are hereby incorporated by reference.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
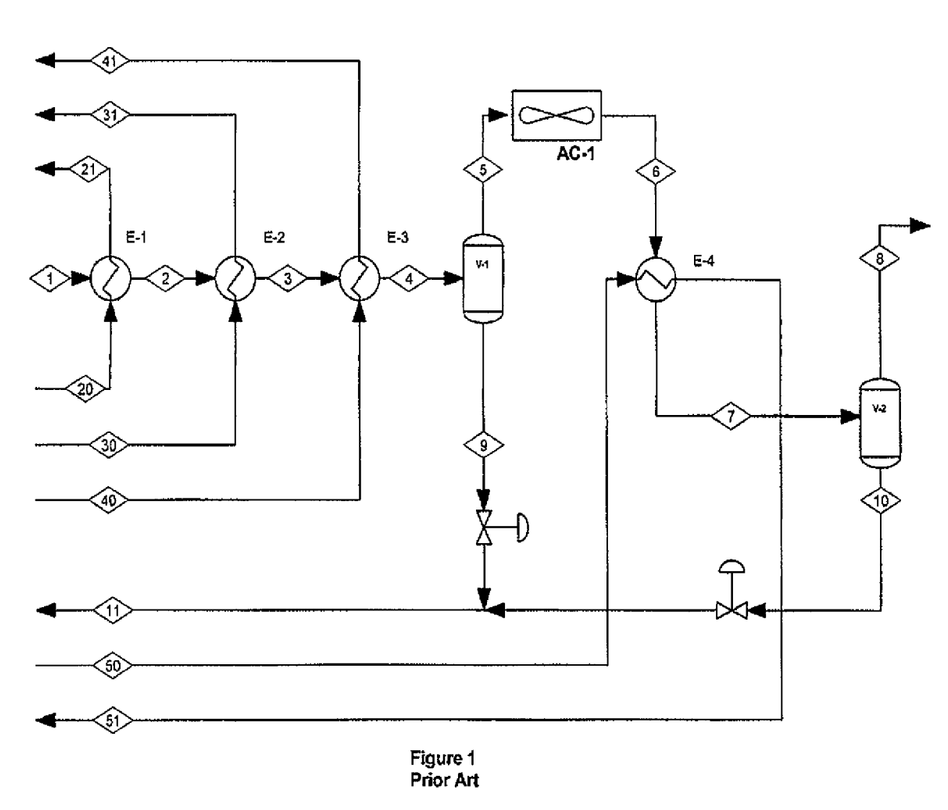
FIG. 1 is a schematic flow diagram of the prior art.

FIG. 1 is a schematic flow diagram illustrating a prior art process of heat exchanger configuration. As shown in FIG. 1, the hydrogen-bearing synthesis gas stream 1 enters heat exchanger E-1 where it is subject to indirect heat exchange with stream 20 (e.g., natural gas). The hydrogen-bearing synthesis gas stream 1 exits heat exchanger E-1 as stream 2 which then undergoes indirect heat exchange in heat exchanger E-2 with stream 30 (e.g., boiler feed water). Thereafter, hydrogen-bearing synthesis gas stream 2 exits heat exchanger E-2 as stream 3 and is introduced into heat exchanger E-3 where it is subjected to indirect heat exchange against stream 40 (e.g., demineralized liquid water). Upon discharge from heat exchanger E-3, the cooled hydrogen-bearing synthesis gas stream 4 is delivered to a gas/liquid separator V-1 from which condensed gases are discharged as liquid stream 9 and cooled hydrogen-bearing synthesis gas is discharged as stream 5. Stream 5 then enters AC-1 (e.g., air-cooled heat exchanger) where the stream undergoes indirect heat exchange with ambient air. Finally, the air cooled stream (stream 6) from AC-1 undergoes indirect heat exchange in E-4 against stream 50 (e.g., liquid cooling water) before being introduced into a second gas/liquid separator V-2. Cooled, hydrogen-bearing, synthesis gas is discharged from the system as stream 8.

Table 1 indicates the molar flows, temperatures, and pressures of typical streams associated with the prior art system shown schematically in flow diagram of FIG. 1, as well as electrical power consumption of the air-cooled heat exchanger.

The following examples are provided to illustrate the invention and not to limit the concepts embodied therein. In the foregoing and in the following examples, all temperatures are set forth uncorrected in degrees Celsius, unless otherwise indicated; and, unless otherwise indicated, all parts and percentages are by mol.

Example 1

Partitioned Vessel Combined with External Air Cooling and Separation

Figure 2:
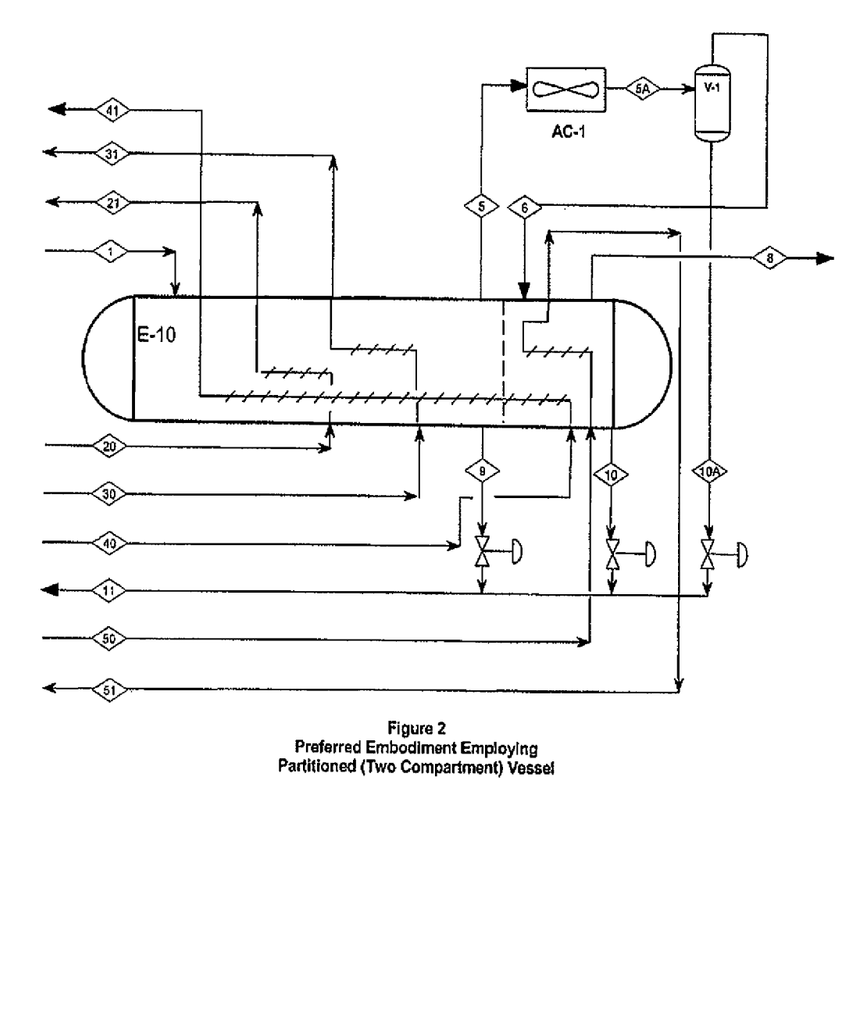
FIG. 2 is a schematic flow diagram illustrating a process of practicing an embodiment of the invention.

As illustrated in FIG. 2, a first hydrogen-bearing synthesis gas stream enters heat exchanger E-10 as stream 1 at 753° F. (401° C.), 376 psia, and exits heat exchanger E-10 as stream 8 at 98° F. (37° C.), 369 psia. The flow rate of stream 1 into the heat exchanger E-10 is 23,170 lb mol/hr, and the flow rate of stream 8 out of heat exchanger E-10 is about 17,057 lb mol/hr. Heat exchanger E-10 is, for example, a multi-circuited finned-tube type heat exchanger integrally housed in a vapor-liquid separator and the hydrogen-bearing synthesis gas flows through shell side. The arrangement may be horizontal as indicated in the figure, vertical or at an angle as best serves the removal of any fluid condensed in the shell side of the heat exchanger.

During its passage through heat exchanger, the hydrogen-bearing synthesis gas undergoes heat exchange with a second stream 20 such as a hydrocarbon stream (e.g. natural gas) which is to be used as a feed stream for the plant (e.g., a stream reformer) which generates the hot synthesis gas. Stream 20 enters heat exchanger E-10 at 120° F. (49° C.), 512 psia, flows through a circuit defined by finned heat exchange tubes, and exits heat exchanger E-10 as stream 21 at 716° F. (380° C.), 502 psia. In addition, stream 1, the hydrogen-bearing synthesis gas, is also subjected to heat exchange with a third stream 30 (e.g., boiler feed water) which enters heat exchanger E-10 at 227° F. (108° C.), 754 psia, flows through a circuit defined by finned heat exchange tubes, and exits as stream 31 at 443° F. (228° C.), 724 psia. Stream 1 also undergoes heat exchange with a fourth stream 40 (e.g., demineralized liquid water) which enters heat exchanger E-10 at 74° F. (23° C.), 61 psia, flows through a circuit defined by finned heat exchange tubes, and exits as stream 41 at 284° F. (140° C.), 57 psia. Finally, as shown in FIG. 2, the first stream also exchanges heat with a fifth stream 50 (e.g., liquid cooling water) which enters heat exchanger E-10 at 92° F. (33° C.), 55 psia, flows through a circuit defined by finned heat exchange tubes, and exits as stream 51 at 107° F. (42° C.), 52 psia.

Stream 1 exchanges heat simultaneously with streams 40 and 20, then streams 40 and 30, and finally streams 40 and 50. The advantage of this arrangement is to accomplish more effective heat transfer than would be possible with multiple tube side fluid streams arranged in series without interlacing of their circuitry.

As shown in the embodiment illustrated in FIG. 2, the heat exchanger can be partitioned. Thus, stream 1 undergoes heat exchange with streams 20, 30 and 40, in a first section of the heat exchanger. From the first section, the synthesis gas can then be delivered as stream 5 to an air-cooled exchanger AC-1 for heat exchange with ambient air. Thereafter, stream 5 can be removed from AC-1 as stream 5A and introduced into a gas/liquid separator V-1. A resultant gas stream 6 can then be removed from V-1 is introduced back into a second section of heat exchanger E-10 where it can undergo heat exchange with stream 50 and stream 40. Resultant cooled hydrogen-containing synthesis gas can then be removed from B-10 as stream 8.

Condensate formed in the first section, the second section, and separator V-1 can be removed as streams 9, 10, and 10a, respectively, combined, and then discharged from the system.

Table 2 lists exemplary compositions, molar flow rates, temperatures, pressures, enthalpies, and entropies for the streams of the embodiment illustrated in FIG. 2. Table 2 also lists the air cooler duty (in BTU/hr) and electrical power consumption (in terms of air cooler fan power) for the air-cooled heat exchanger AC-1.

Under the invention integrated heat exchange design, the total UA (UA is the product of the heat transfer coefficient and the required heat transfer area) required is estimated to be 3,506,060 BTU/F-hr. In the prior art system illustrated in FIG. 1, wherein the second, third, fourth, and fifth streams are arranged in series without integrated heat exchange, the total UA required to accomplish the same amount of cooling for the discharged hydrogen-bearing synthesis stream (i.e., cooled from 753° F. (401° C.), 376 psia, to 98° F. (37° C.), 369 psia) is estimated to be 4,630,014 BTU/F-hr.

For similar streams operating at similar conditions of temperature, pressure and chemical composition, one can assume the heat transfer coefficient is essentially the constant. Therefore, integrated heat exchanger design of the invention can achieve the same desired hydrogen-bearing synthesis gas stream exit temperature with 24.3% less heat transfer area.

Example 2

Figure 3:
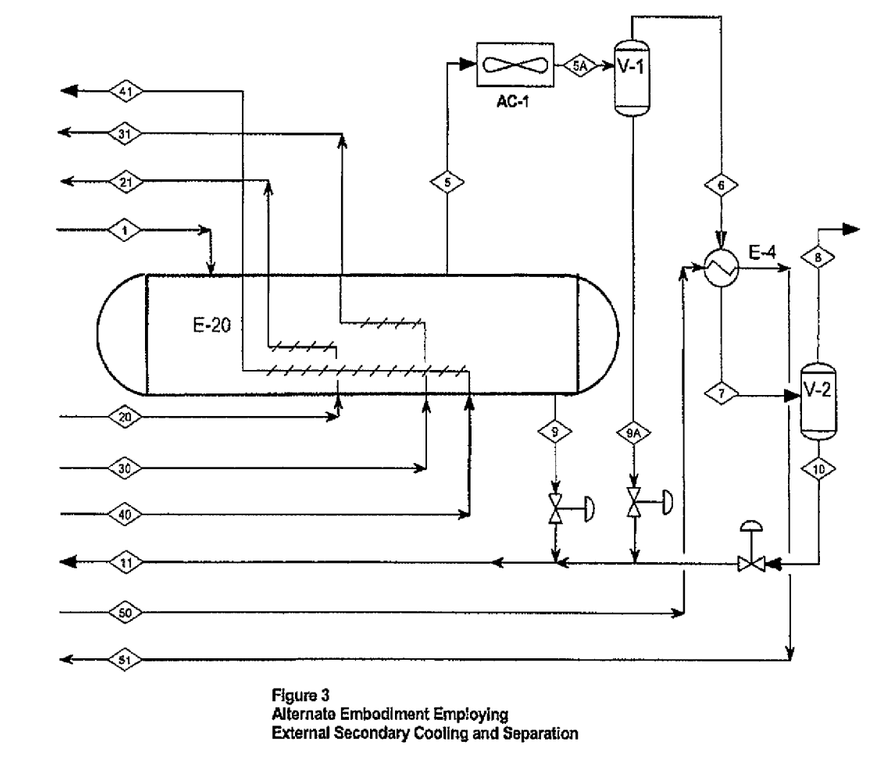
FIGS. 3, 4 and 5 are schematic flow diagrams illustrating variations of the embodiment of FIG. 2.

Non-Partitioned Vessel Combined with External Air Cooling and Separation, and External Secondary Cooling and Separation As illustrated in FIG. 3, a first hydrogen-bearing synthesis gas stream enters heat exchanger E-20 as stream 1 at 753° F. (401° C.), 383 psia, and exits heat exchanger E-20 as stream 5 at 208° F. (98° C.), 382 psia. The flow rate of stream 1 into the heat exchanger E-20 is 23,170 lb mol/hr, and the flow rate of stream 5 out of heat exchanger E-20 is about 17,643 lb mol/hr. Heat exchanger E-10 is, for example, a multi-circuited finned-tube type heat exchanger integrally housed in a vapor-liquid separator and the hydrogen-bearing synthesis gas flows through shell side. The arrangement may be horizontal as indicated in the figure, vertical or at an angle as best serves the removal of any fluid condensed in the shell side of the heat exchanger.

Within heat exchanger E-20, stream 1 is subjected to indirect heat exchange with a second stream 20 (e.g., natural gas) which is introduced into heat exchanger E-20 at 120° F. (49° C.), 512 psia, flows through a circuit defined by finned heat exchange tubes, and is discharged from heat exchanger E-20 as stream 21 at 716° F. (380° C.), 502 psia. During its passage through heat exchanger E-20, the first stream also undergoes heat exchange with a third stream 30 (e.g., boiler feed water) which enters heat exchanger E-20 at 227° F. (108° C.), 754 psia, flows through a circuit defined by finned heat exchange tubes, and exits as stream 31 at 443° F. (228° C.), 724 psia. In heat exchanger E-20, the first stream also exchanges heat with a fourth stream 40 (e.g., demineralized liquid water) which is introduced into heat exchanger at 74° F. (23° C.), 61 psia, flows through a circuit defined by finned heat exchange tubes, and exiting as stream 41 at 284° F. (140° C.), 57 psia.

As noted above, in the embodiment illustrated in FIG. 2, the heat exchanger is shown to be partitioned. However, in the embodiment illustrated in FIG. 3, the heat exchanger is not partitioned, but the synthesis gas can still be subjected to external cooling in an air-cooled exchanger. As shown in FIG. 3, after undergoing heat exchange with streams 20, 30 and 40, and prior to undergoing heat exchange with a stream 50 (e.g., liquid cooling water), stream 1 can be removed from heat exchanger E-20 as stream 5 and subjected to cooling by indirect heat exchange with ambient air in air-cooled exchanger. Thereafter, stream 5 can be removed from AC-1 as stream 5A and introduced into a gas/liquid separator V-1.

Resultant gas stream 6 removed from V-1 need not be reintroduced into heat exchanger E-20. Instead, stream 6 may be introduced into a second heat exchanger E-4 where it can undergo heat exchange with stream 50 (e.g. cooling water). Cooled hydrogen-containing synthesis gas can then be removed from E-4 as stream 7 and delivered to a second gas/liquid separator V-2. The liquid condensate is separated from the stream and the resultant cooled hydrogen-containing synthesis gas can be discharged from V-2 as stream 8.

Table 3 lists exemplary compositions, molar flow rates, temperatures, pressures, enthalpies, and entropies for the streams of the embodiment illustrated in FIG. 3. Table 3 also lists the air cooler duty (in BTU/hr) and electrical power consumption (in terms of air cooler fan power) for the air-cooled heat exchanger AC-1.

Under the invention integrated heat exchange design, the total UA required is estimated to be 2,667,704 BTU/F-hr. In the prior art system illustrated in FIG. 1, wherein the second, and third, streams are arranged in series without integrated heat exchange, the total UA required to accomplish the same amount of cooling for the discharged hydrogen-bearing synthesis gas stream (i.e., cooled from 753° F. (401° C.), 383 psia, to 208° F. (98° C.), 382 psia) is estimated to be 3,859,477 BTU/F-hr, which is 45% higher than the above integrated design.

Example 3

Partitioned Vessel with Only External Air Cooling and Separation

Figure 4:
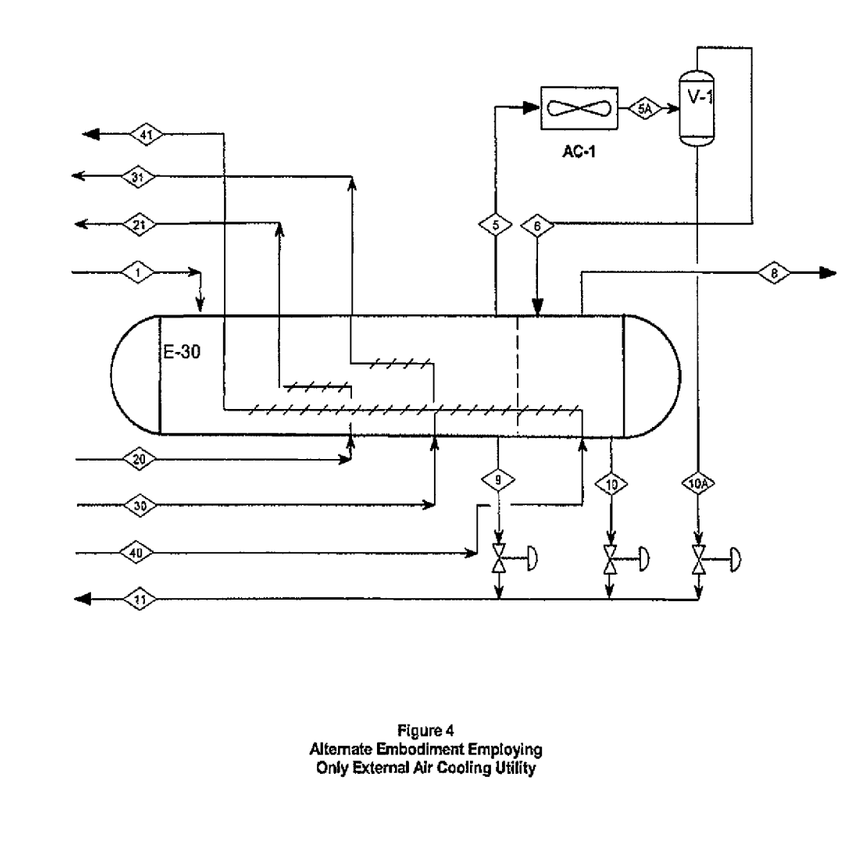

FIG. 4 illustrates an embodiment with a partitioned heat exchanger, similar to the embodiment of FIG. 2, except that the hydrogen-bearing synthesis gas stream is not subjected to heat exchange with a fourth stream (compare stream 50 in FIG. 2) in the second part of the heat exchanger.

As shown in FIG. 4, a first hydrogen-bearing synthesis gas stream enters heat exchanger E-30 as stream 1 at 753° F. (401° C.), 373 psia, and exits heat exchanger E-30 as stream 8 at 98° F. (37° C.), 366 psia. The flow rate of stream 1 into the heat exchanger E-30 is 23,170 lb mol/hr, and the flow rate of stream 8 out of heat exchanger E-30 is about 17,058 lb mol/hr. Heat exchanger E-10 is, for example, a multi-circuited finned-tube type heat exchanger integrally housed in a vapor-liquid separator and the hydrogen-bearing synthesis gas flows through shell side. The arrangement may be horizontal as indicated in the figure, vertical or at an angle as best serves the removal of any fluid condensed in the shell side of the heat exchanger.

In a first section of heat exchanger E-30, stream 1 initially is subjected to indirect heat exchange with a second stream 20 (e.g., natural gas) which enters heat exchanger E-30 at 120° F. (49° C.), 512 psia, flows through a circuit defined by finned heat exchange tubes, and exits heat exchanger E-30 as stream 21 at 716° F. (380° C.), 502 psia. In addition, first stream 1 also undergoes heat exchange in heat exchanger E-30 with a third stream 30 (e.g., boiler feed water) which is introduced into heat exchanger E-30 at 227° F. (108° C.), 754 psia, flows through a circuit defined by finned heat exchange tubes, and discharged from heat exchanger E-30 as stream 31 at 443° F. (228° C.), 724 psia. Further, the first stream also exchanges heat with a fourth stream 40 (e.g., demineralized liquid water) which is delivered to heat exchanger E-30 entering at 74° F. (23° C.), 61 psia, flows through a circuit defined by finned heat exchange tubes, and exits as stream 41 at 284° F. (140° C.), 56 psia.

As mentioned above, in the embodiment illustrated in FIG. 4, the heat exchanger is partitioned. Thus, after undergoing heat exchange with streams 20, 30 and 40, and prior to undergoing additional heat exchange with stream 40, stream 1 is removed from a first section of heat exchanger E-30 as stream 5 and subjected to cooling by indirect heat exchange with ambient air in air-cooled exchanger AC-1. Thereafter, stream 5 is removed from AC-1 as stream 5A and introduced into a gas/liquid separator V-1.

The resultant gas stream 6 removed from V-1 is then introduced back into a second section of heat exchanger E-30 where it undergoes further heat exchange with stream 40. The resultant cooled hydrogen-containing synthesis gas is removed from E-30 as stream 8.

Table 4 lists exemplary compositions, molar flow rates, temperatures, pressures, enthalpies, and entropies for the streams of the embodiment illustrated in FIG. 4. Table 4 also lists the air cooler duty (in BTU/hr) and electrical power consumption (in terms of air cooler fan power) for the air-cooled heat exchanger AC-1.

Under the invention integrated heat exchange design, the total UA required is estimated to be 5,568,498 BTU/F-hr. In the prior art system illustrated in FIG. 1, wherein the second, third and fourth, streams are arranged in series without integrated heat exchange, the total UA required to accomplish the same amount of cooling for the discharged hydrogen-bearing synthesis gas stream (i.e., cooled from 753° F. (401° C.), 383 psia, to 208° F. (98° C.), 382 psia) is estimated to be 3,859,477 BTU/F-hr.

In this example, the need for cooling water (stream 50) is totally eliminated thus reducing the utility consumption of the process.

Example 4

Figure 5:
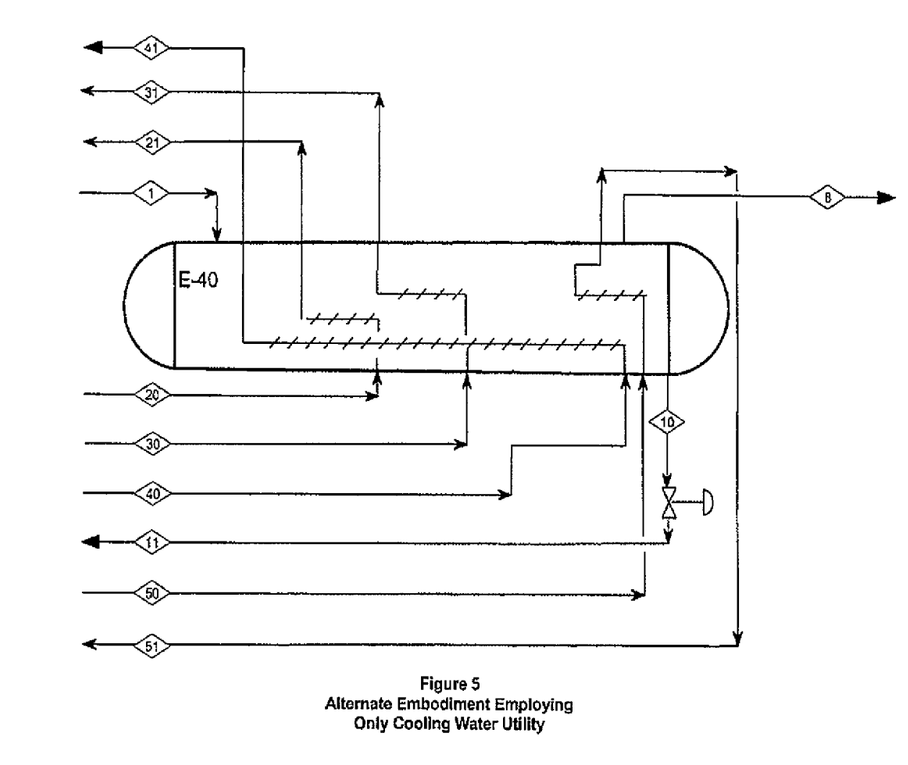

Non-Partitioned Vessel Without External Air Cooling and Separation, and with Only Cooling Water Utility In the embodiment illustrated in FIG. 5, a non-partitioned heat exchanger is utilized. Thus, the embodiment is similar to the embodiment illustrated in FIG. 3. However, the embodiment of FIG. 5 does not employ an external air-cooled exchanger AC-1 or a gas/liquid separator V-1, nor does it utilize a second heat exchanger E-4 for heat exchange with a stream 50 (e.g., liquid cooling water).

In FIG. 5, a first hydrogen-bearing synthesis gas stream enters heat exchanger E-40 as stream 1 at 753° F. (401° C.), 373 psia, and exits heat exchanger E-40 as stream 8 at 98° F. (37° C.), 366 psia. The flow rate of stream 1 into the heat exchanger E-40 is 23,170 lb mol/hr, and the flow rate of stream 8 out of heat exchanger E-40 is about 17,056 lb mol/hr. Heat exchanger E-10 is, for example, a multi-circuited finned-tube type heat exchanger integrally housed in a vapor-liquid separator and the hydrogen-bearing synthesis gas flows through shell side. The arrangement may be horizontal as indicated in the figure, vertical or at an angle as best serves the removal of any fluid condensed in the shell side of the heat exchanger.

In heat exchanger E-40, the first stream 1 undergoes heat exchange with a second stream 20 (e.g., natural gas) which is introduced into heat exchanger E-40 at 120° F. (49° C.), 512 psia, flows through a circuit defined by finned heat exchange tubes, and discharged from heat exchanger E-40 as stream 21 at 716° F. (380° C.), 502 psia. The first stream is also subjected to heat exchange with a third stream 30 (e.g., boiler feed water) which enters heat exchanger E-40 at 227° F. (108° C.), 754 psia, flows through a circuit defined by finned heat exchange tubes, and exits heat exchanger E-40 as stream 31 at 443° F. (228° C.), 724 psia. In addition, the first stream also exchanges heat with a fourth stream 40 (e.g., demineralized liquid water) which is introduced into heat exchanger E-40 at 107° F. (42° C.), 61 psia, flows through a circuit defined by finned heat exchange tubes, and discharged from heat exchanger E-40 as stream 41 at 284° F. (140° C.), 57 psia. Finally, the first stream also exchanges heat with a fifth stream 50 (e.g., liquid cooling water) which is delivered to heat exchanger E-40 at 92° F. (33° C.), 55 psia, flows through a circuit defined by finned heat exchange tubes, and removed from heat exchanger E-40 as stream 51 at 107° F. (42° C.), 52 psia.

The resultant gas stream 8 removed from E-40 is not introduced into an external air-cooled exchanger AC-1 or a second heat exchanger E-4, but is instead discharged from heat exchanger E-40 as cooled hydrogen-containing synthesis gas stream 8.

Table 5 indicates the compositions, molar flow rates, temperatures, pressures, enthalpies, and entropies of streams of the embodiment illustrated in FIG. 5.

Under the invention integrated heat exchange design, the total UA required is estimated to be 3,506,060 BTU/F-hr. In the prior art system illustrated in FIG. 1, wherein the second, third, and fourth streams are arranged in series without integrated heat exchange, the total UA required to accomplish the same amount of cooling for the discharged hydrogen-bearing synthesis gas stream (i.e., cooled from 753° F. (401° C.), 373 psia, to 98° F. (37° C.), 366 psia) is estimated to be 3,859,477 BTU/F-hr. This arrangement of the invention integrated heat exchanger design using the integrated heat transfer zones can achieve the same desired hydrogen-bearing synthesis gas stream exit temperature with 9.2% less heat transfer area.

In addition, in this example, the total installed cost of the air-cooled exchanger is eliminated from the facility.

The following table lists typical ranges for the temperatures of the streams subjected to heat exchange in the embodiments illustrated in FIGS. 2-5.

| Typical Ranges of Temperatures of Hot and Cool Heat Exchange Streams | | | | | |
|---|---|---|---|---|---|
| Stream | Relative Temperature | Maximum, ° F. | Minimum, ° F. | Maximum, ° C. | Minimum, ° C. |
| Hot Synthesis Gas | Hot | 780 | 550 | 416 | 286 |
| Hydrocarbon Feed | Cold | 120 | 50 | 49 | 10 |
| Boiler Feed Water | Cold | Bubble Point at Pressure | 50 | Bubble Point at Pressure | 10 |
| Demineralized Water | Cold | 140 | 50 | 60 | 10 |
| Cooling Water | Cold | 120 | 50 | 49 | 10 |
| Ambient Air | Cold | 125 | −40 | 52 | −40 |

While the invention has been described with a certain degree of particularity, it is manifested that many changes may be made in the details of construction and the arrangement of components without departing from the spirit and scope of this disclosure.

It is understood that the invention is not limited to embodiments set forth herein for purposes of exemplification, but is limited only by the scope of the attached claim or claims, including the full range of equivalency to which each element thereof is entitled.

TABLE 1

Material Balance with Energy Consumption for the Prior Art Embodiment of FIG. 1

| Stream Number | 1 | 2 | 3 | 4 | 5 | 6 | 7 | 8 | 9 | 10 |
|---|---|---|---|---|---|---|---|---|---|---|
| Component Flow | | | | | | | | | | |
| Hydrogen, lbmol/hr | 12571.0 | 12571.0 | 12571.0 | 12571.0 | 12570.3 | 12570.3 | 12570.3 | 12570.3 | 0.7 | 0.0 |
| Nitrogen, lbmol/hr | 46.3 | 46.3 | 46.3 | 46.3 | 46.3 | 46.3 | 46.3 | 46.3 | 0.0 | 0.0 |
| Carbon Monoxide, lbmol/hr, | 556.1 | 556.1 | 556.1 | 556.1 | 556.1 | 556.1 | 556.1 | 556.1 | 0.0 | 0.0 |
| Carbon Dioxide, lbmol-hr | 2783.0 | 2783.0 | 2783.0 | 2783.0 | 2778.5 | 2778.5 | 2778.5 | 2777.2 | 4.5 | 1.3 |
| Water, lbmol/hr | 6147.6 | 6147.0 | 6147.6 | 6147.6 | 767.8 | 768.8 | 767.8 | 41.6 | 5379.9 | 726.1 |
| Methane, lbmol/hr | 1065.9 | 1065.9 | 1065.9 | 1065.9 | 1065.9 | 1065.9 | 1065.9 | 1065.9 | 0.0 | 0.0 |
| Ethane, lbmol/hr | 0.0 | 0.0 | 0.0 | 0.0 | 0.0 | 0.0 | 0.0 | 0.0 | 0.0 | 0.0 |
| Propane, lbmol/hr | 0.0 | 0.0 | 0.0 | 0.0 | 0.0 | 0.0 | 0.0 | 0.0 | 0.0 | 0.0 |
| i-Butane, lbmol/hr | 0.0 | 0.0 | 0.0 | 0.0 | 0.0 | 0.0 | 0.0 | 0.0 | 0.0 | 0.0 |
| n-Butane, lbmol/hr | 0.0 | 0.0 | 0.0 | 0.0 | 0.0 | 0.0 | 0.0 | 0.0 | 0.0 | 0.0 |
| Total, lbmol/hr | 23170.0 | 23170.0 | 23170.0 | 23170.0 | 17784.9 | 17784.9 | 17784.9 | 17057.4 | 5385.1 | 727.5 |
| Temperature, °F. | 753 | 598 | 304 | 218 | 218 | 120 | 98 | 98 | 218 | 98 |
| Pressure, psia | 412 | 402 | 392 | 382 | 382 | 376 | 366 | 366 | 382 | 366 |
| Enthalpy, BTU/lbmol | −45139 | −46435 | −50476 | −53492 | −33331 | −34779 | −34989 | −31261 | −12075 | −122380 |
| Entropy, BTU/lbmol-°F. | 23170 | 23170 | 23170 | 23170 | 17785 | 17785 | 17785 | 17057 | 5385 | 728 |
| Air Cooler Duty, BTU/hr | 25,751,807 | | | | | | | | | |
| Air Cooler Fan Power, kW | 42.5 | | | | | | | | | |
| Ambient Temperature, °F. | 90 | | | | | | | | | |

| Stream Number | 11 | 20 | 21 | 30 | 31 | 40 | 41 | 50 | 51 |
|---|---|---|---|---|---|---|---|---|---|
| Component Flow | | | | | | | | | |
| Hydrogen, lbmol/hr | 0.7 | 132.0 | 132.0 | 0.0 | 0.0 | 0.0 | 0.0 | 0.0 | 0.0 |
| Nitrogen, lbmol/hr | 0.0 | 39.7 | 39.7 | 0.0 | 0.0 | 0.0 | 0.0 | 0.0 | 0.0 |
| Carbon Monoxide, lbmol/hr, | 0.0 | 0.0 | 0.0 | 0.0 | 0.0 | 0.0 | 0.0 | 0.0 | 0.0 |
| Carbon Dioxide, lbmol-hr | 5.9 | 74.9 | 74.9 | 0.0 | 0.0 | 0.0 | 0.0 | 0.0 | 0.0 |
| Water, lbmoi/hr | 6161.0 | 0.0 | 0.0 | 21500.0 | 21500.0 | 17660 | 17660 | 7827 | 7827 |
| Methane, lbmol/hr | 0.0 | 4131.3 | 4131.3 | 0.0 | 0.0 | 0.0 | 0.0 | 0.0 | 0.0 |
| Ethane, lbmol/hr | 0.0 | 55.3 | 55.3 | 0.0 | 0.0 | 0.0 | 0.0 | 0.0 | 0.0 |
| Propane, lbmol/hr | 0.0 | 17.4 | 17.4 | 0.0 | 0.0 | 0.0 | 0.0 | 0.0 | 0.0 |
| i-Butane, lbmol/hr | 0.0 | 1.8 | 1.8 | 0.0 | 0.0 | 0.0 | 0.0 | 0.0 | 0.0 |
| n-Butane, lbmol/hr | 0.0 | 2.2 | 2.2 | 0.0 | 0.0 | 0.0 | 0.0 | 0.0 | 0.0 |
| Total, lbmol/hr | 6112.6 | 4454.6 | 4454.6 | 21500.0 | 21500.0 | 17660.0 | 17660.0 | 7827 | 7827 |
| Temperature, °F. | 204 | 120 | 716 | 227 | 443 | 74 | 284 | 81 | 107 |
| Pressure, psia | 366 | 512 | 502 | 754 | 724 | 61 | 57 | 55 | 45 |
| Enthalpy, BTU/lbmol | −120349 | −33291 | −26559 | −119865 | −115511 | −122756 | −118799 | −122621 | −622145 |
| Entropy, BTU/lbmol-°F. | 37.2 | 32.1 | 30.5 | 31.3 | 28.0 | 17660 | 17660 | 7827 | 7827 |

TABLE 2

Material Balance with Energy Consumption for Partitioned Vessel Case

| Stream Number | 1 | 5 | 5A | 6 | 8 | 9 | 10 | 10A | 11 |
|---|---|---|---|---|---|---|---|---|---|
| Component Flow | | | | | | | | | |
| Hydrogen, lbmol/hr | 12571.0 | 12570.3 | 12570.3 | 12570.3 | 12570.3 | 0.7 | 0.1 | 0.2 | 1.0 |
| Nitrogen, lbmol/hr | 46.3 | 46.3 | 46.3 | 46.3 | 46.3 | 0.0 | 0.0 | 0.0 | 0.0 |
| Carbon Monoxide, lbmol/hr, | 556.1 | 556.1 | 556.1 | 556.1 | 556.1 | 0.0 | 0.0 | 0.0 | 0.0 |
| Carbon Dioxide, lbmol-hr | 2783.0 | 2781.3 | 2781.3 | 2781.3 | 2777.5 | 1.7 | 3.0 | 0.8 | 5.5 |
| Water, lbmol/hr | 6147.6 | 3080.9 | 3080.9 | 1890.8 | 41.3 | 3066.8 | 1849.5 | 1190.0 | 6106.3 |
| Methane, lbmol/hr | 1065.9 | 1065.9 | 1065.9 | 1065.9 | 1065.9 | 0.0 | 0.0 | 0.0 | 0.0 |
| Ethane, lbmol/hr | 0.0 | 0.0 | 0.0 | 0.0 | 0.0 | 0.0 | 0.0 | 0.0 | 0.0 |
| Propane, lbmol/hr | 0.0 | 0.0 | 0.0 | 0.0 | 0.0 | 0.0 | 0.0 | 0.0 | 0.0 |
| i-Butane, lbmol/hr | 0.0 | 0.0 | 0.0 | 0.0 | 0.0 | 0.0 | 0.0 | 0.0 | 0.0 |
| n-Butane, lbmol/hr | 0.0 | 0.0 | 0.0 | 0.0 | 0.0 | 0.0 | 0.0 | 0.0 | 0.0 |
| Total, lbmol/hr | 23170.0 | 20100.8 | 20100.8 | 18909.7 | 17057.1 | 3069.2 | 1852.6 | 1191.0 | 6112.9 |
| Temperature, °F. | 753 | 290 | 263 | 263 | 98 | 290 | 112 | 263 | 232 |
| Pressure, psia | 376 | 376 | 370 | 370 | 369 | 376 | 369 | 370 | 369 |
| Enthalpy, BTU/lbmol | −45136 | −40789 | −41993 | −41993 | −31263 | −118664 | −122111 | −119207 | −119814 |
| Entropy, BTU/lbmol-°F. | 37.2 | 32.1 | 30.5 | 31.3 | 28.0 | 19.1 | 14.0 | 18.4 | 16.8 |

TABLE 2-continued

Material Balance with Energy Consumption for Partitioned Vessel Case

| | |
|---|---|
| Air Cooler Duty, BTU/hr | 24,488,016 |
| Air Cooler Fan Power, kW | 17.0 |
| Ambient Temperature, °F. | 90 |

| Stream Number | 20 | 21 | 30 | 31 | 40 | 41 | 50 | 51 |
|---|---|---|---|---|---|---|---|---|
| Component Flow | | | | | | | | |
| Hydrogen, lbmol/hr | 132.0 | 132.0 | 0.0 | 0.0 | 0.0 | 0.0 | 0.0 | 0.0 |
| Nitrogen, lbmol/hr | 39.7 | 39.7 | 0.0 | 0.0 | 0.0 | 0.0 | 0.0 | 0.0 |
| Carbon Monoxide, lbmol/hr, | 0.0 | 0.0 | 00 | 0.0 | 0.0 | 0.0 | 0.0 | 0.0 |
| Carbon Dioxide, lbmol-hr | 74.9 | 74.9 | 0.0 | 0.0 | 0.0 | 0.0 | 0.0 | 0.0 |
| Water, lbmol/hr | 0.0 | 0.0 | 21500.0 | 21500.0 | 17660.0 | 17660.0 | 7827.0 | 7827.0 |
| Methane, lbmol/hr | 4131.3 | 4131.3 | 0.0 | 0.0 | 0.0 | 0.0 | 0.0 | 0.0 |
| Ethane, lbmol/hr | 55.3 | 55.3 | 0.0 | 0.0 | 0.0 | 0.0 | 0.0 | 0.0 |
| Propane, lbmol/hr | 17.4 | 17.4 | 0.0 | 0.0 | 0.0 | 0.0 | 0.0 | 0.0 |
| i-Butane, lbmol/hr | 1.8 | 1.8 | 0.0 | 0.0 | 0.0 | 0.0 | 0.0 | 0.0 |
| n-Butane, lbmol/hr | 2.2 | 2.2 | 0.0 | 0.0 | 0.0 | 0.0 | 0.0 | 0.0 |
| Total, lbmol/hr | 4454.6 | 4454.6 | 21500.0 | 21500.0 | 17660.0 | 17660. a | 7827.0 | 7827.0 |
| Temperature, °F. | 120 | 716 | 227 | 443 | 74 | 284 | 92 | 107 |
| Pressure, psia | 512 | 502 | 754 | 724 | 61 | 57 | 55 | 52 |
| Enthalpy, BTU/lbmol | −33291 | −26559 | −119865 | 115511 | −122756 | −118799 | −122422 | −122144 |
| Entropy, BTU/lbmol-°F. | 37.4 | 45.2 | 17.4 | 22.9 | 12.7 | 19.0 | 13.3 | 13.8 |
| Air Cooler Duty, BTU/hr | | | | | | | | |
| Air Cooler Fan Power, kW | | | | | | | | |
| Ambient Temperature, °F. | | | | | | | | |

TABLE 3

Material Balance with Energy Consumption for Alternate Embodiment Employing External Cooling and Separation

| Stream Number | 1 | 5 | 5A | 6 | 7 | 8 | 9 |
|---|---|---|---|---|---|---|---|
| Component Flow | | | | | | | |
| Hydrogen, lbmol/hr | 12571.0 | 12569.9 | 12569.9 | 12569.9 | 12569.9 | 12569.9 | 1.0 |
| Nitrogen, lbmol/hr | 46.3 | 46.3 | 46.3 | 46.3 | 46.3 | 46.3 | 0.0 |
| Carbon Monoxide, lbmol/hr, | 556.1 | 556.1 | 556.1 | 556.1 | 556.1 | 556.1 | 0.0 |
| Carbon Dioxide, lbmol-hr | 2783.0 | 2779.1 | 2779.1 | 2778.2 | 2778.2 | 2778.2 | 3.9 |
| Water, lbmol/hr | 6147.6 | 625.1 | 625.1 | 76.9 | 76.9 | 41.6 | 5522.5 |
| Methane, lbmol/hr | 1065.9 | 1065.9 | 1065.9 | 1065.9 | 1065.9 | 1065.9 | 0.0 |
| Ethane, lbmol/hr | 0.0 | 0.0 | 0.0 | 0.0 | 0.0 | 0.0 | 0.0 |
| Propane, lbmol/hr | 0.0 | 0.0 | 0.0 | 0.0 | 0.0 | 0.0 | 0.0 |
| i.Butane, lbmol/hr | 0.0 | 0.0 | 0.0 | 0.0 | 0.0 | 0.0 | 0.0 |
| n-Butane, lbmol/hr | 0.0 | 0.0 | 0.0 | 0.0 | 0.0 | 0.0 | 0.0 |
| Total, lbmol/hr | 23170.0 | 17642.5 | 17642.5 | 17093.4 | 17093.4 | 17058.1 | 5527.5 |
| Temperature, °F. | 753 | 208 | 120 | 120 | 98 | 98 | 255 |
| Pressure, psia | 383 | 382 | 376 | 376 | 366 | 366 | 382 |
| Enthalpy, BTU/lbmol | −45136 | −32850 | −34079 | .31257 | −31458 | .31270 | .119363 |
| Entropy, BTU/lbmol-°F. | 37.1 | 29.8 | 27.9 | 28.3 | 28.0 | 28.0 | 18.2 |
| Air Cooler Duty, BTU/hr | 21,975,131 | | | | | | |
| Air Cooler Fan Power, kW | 39.0 | | | | | | |
| Ambient Temperature, °F. | 90 | | | | | | |

| Stream Number | 9A | 10 | 11 | 20 | 21 | 30 | 31 |
|---|---|---|---|---|---|---|---|
| Component Flow | | | | | | | |
| Hydrogen, lbmol/hr | 0.0 | 0.0 | 1.1 | 132.0 | 132.0 | 0.0 | 0.0 |
| Nitrogen, lbmol/hr | 0.0 | 0.0 | 0.0 | 39.7 | 39.7 | 0.0 | 0.0 |
| Carbon Monoxide, lbmol/hr, | 0.0 | 0.0 | 0.0 | 0.0 | 0.0 | 0.0 | 0.0 |
| Carbon Dioxide, lbmol-hr | 0.8 | 0.1 | 4.8 | 74.9 | 74.9 | 0.0 | 0.0 |
| Water, lbmol/hr | 548.2 | 35.3 | 6106.0 | 0.0 | 0.0 | 21500.0 | 21500.0 |
| Methane, lbmol/hr | 0.0 | 0.0 | 0.0 | 4131.3 | 4131.3 | 0.0 | 0.0 |
| Ethane, lbmol/hr | 0.0 | 0.0 | 0.0 | 55.3 | 55.3 | 0.0 | 0.0 |
| Propane, lbmol/hr | 0.0 | 0.0 | 0.0 | 17.4 | 17.4 | 0.0 | 0.0 |
| i.Butane, lbmol/hr | 0.0 | 0.0 | 0.0 | 1.8 | 1.8 | 0.0 | 0.0 |

TABLE 3-continued

Material Balance with Energy Consumption for Alternate Embodiment Employing External Cooling and Separation

| n-Butane, lbmol/hr | 0.0 | 0.0 | 0.0 | 2.2 | 2.2 | 0.0 | 0.0 |
|---|---|---|---|---|---|---|---|
| Total, lbmol/hr | 549.0 | 35.4 | 6111.9 | 4454.6 | 4454.6 | 21500.0 | 21500.0 |
| Temperature, °F. | 120 | 98 | 204 | 120 | 716 | 227 | 443 |
| Pressure, psia | 376 | 366 | 366 | 512 | 502 | 754 | 724 |
| Enthalpy, BTU/lbmol | .121954 | .122380 | .120331 | .33291 | .26559 | −119865 | 115511 |
| Entropy, BTU/lbmol-°F. | 14.3 | 13.6 | 16.8 | 37.4 | 45.2 | 17.4 | 22.9 |

| Stream Number | 40 | 41 | 50 | 51 |
|---|---|---|---|---|
| Component Flow | | | | |
| Hydrogen, lbmol/hr | 0.0 | 0.0 | 0.0 | 0.0 |
| Nitrogen, lbmol/hr | 0.0 | 0.0 | 0.0 | 0.0 |
| Carbon Monoxide, lbmol/hr, | 0.0 | 0.0 | 0.0 | 0.0 |
| Carbon Dioxide, lbmol-hr | 0.0 | 0.0 | 0.0 | 0.0 |
| Water, lbmol/hr | 17660.0 | 17660.0 | 12394.3 | 12394.3 |
| Methane, lbmol/hr | 0.0 | 0.0 | 0.0 | 0.0 |
| Ethane, lbmol/hr | 0.0 | 0.0 | 0.0 | 0.0 |
| Propane, lbmol/hr | 0.0 | 0.0 | 0.0 | 0.0 |
| i.Butane, lbmol/hr | 0.0 | 0.0 | 0.0 | 0.0 |
| n-Butane, lbmol/hr | 0.0 | 0.0 | 0.0 | 0.0 |
| Total, lbmol/hr | 17660.0 | 17660.0 | 12394.3 | 12394.3 |
| Temperature, °F. | 74 | 284 | 92 | 107 |
| Pressure, psia | 61 | 57 | 55 | 45 |
| Enthalpy, BTU/lbmol | .122756 | .118799 | .122422 | −122144 |
| Entropy, BTU/lbmol-°F. | 12.7 | 19.0 | 13.3 | 13.8 |

TABLE 4

Material Balance with Energy Consumption for Alternate Embodiment Employing Only External Cooling Utility

| Stream Number | 1 | 5 | 5A | 6 | 8 | 9 | 10 | 10A |
|---|---|---|---|---|---|---|---|---|
| Component Flow | | | | | | | | |
| Hydrogen, lbmol/hr | 12571.0 | 12570.5 | 12570.5 | 0.3 | 12570.0 | 0.2 | 0.0 | 0.3 |
| Nitrogen, lbmol/hr | 46.3 | 46.3 | 46.3 | 0.0 | 46.3 | 0.0 | 0.0 | 0.0 |
| Carbon Monoxide, lbmol/hr, | 556.1 | 556.1 | 556.1 | 0.0 | 556.1 | 0.0 | 0.0 | 0.0 |
| Carbon Dioxide, lbmol-hr | 2783.0 | 2782.0 | 2782.0 | 0.8 | 2778.2 | 2.6 | 0.5 | 0.8 |
| Water, lbmol/hr | 6147.6 | 4211.0 | 4211.0 | 1342.2 | 41.6 | 2555.6 | 271.6 | 1342.2 |
| Methane, lbmol/hr | 1065.9 | 1065.9 | 1065.9 | 0.0 | 1065.9 | 0.0 | 0.0 | 0.0 |
| Ethane, lbmo/lhr | 0.0 | 0.0 | 0.0 | 0.0 | 0.0 | 0.0 | 0.0 | 0.0 |
| Propane, lbmollhr | 0.0 | 0.0 | 0.0 | 0.0 | 0.0 | 0.0 | 0.0 | 0.0 |
| i-Butane, lbmollhr | 0.0 | 0.0 | 0.0 | 0.0 | 0.0 | 0.0 | 0.0 | 0.0 |
| n-Butane, lbmol/hr | 0.0 | 0.0 | 0.0 | 0.0 | 0.0 | 0.0 | 0.0 | 0.0 |
| Total, lbmol/hr | 23170.0 | 21231.9 | 21231.9 | 1343.3 | 17058.1 | 2558.4 | 272.2 | 1343.3 |
| Temperature, °F. | 753 | 307 | 285 | 285 | 98 | 174 | 98 | 285 |
| Pressure, psia | 373 | 373 | 367 | 367 | 366 | 366 | 366 | 367 |
| Enthalpy, BTU/lbmol | −45135 | −43935 | −45148 | −118773 | −31270 | −120911 | −122380 | −122380 |
| Entropy, BTU/lbmol-°F. | 37.2 | 32.8 | 31.2 | 19.0 | 28.0 | 15.9 | 13.6 | 13.6 |
| Air Cooler Duty, BTU/hr | 25,737,519 | | | | | | | |
| Air Cooler Fan Power, kW | 45.0 | | | | | | | |
| Ambient Temperature, °F. | 90 | | | | | | | |

| Stream Number | 11 | 11 | 20 | 21 | 30 | 31 | 40 |
|---|---|---|---|---|---|---|---|
| Component Flow | | | | | | | |
| Hydrogen, lbmol/hr | 1.0 | 20 | 21 | 30 | 31 | 40 | 41 |
| Nitrogen, lbmol/hr | 0.0 | | | | | | |
| Carbon Monoxide, lbmol/hr, | 0.0 | 132.0 | 132.0 | 0.0 | 0.0 | 0.0 | 0.0 |
| Carbon Dioxide, lbmol-hr | 4.8 | 39.7 | 39.7 | 0.0 | 0.0 | 0.0 | 0.0 |
| Water, lbmol/hr | 6106.0 | 0.0 | 0.0 | 0.0 | 0.0 | 0.0 | 0.0 |
| Methane, lbmol/hr | 0.0 | 74.9 | 74.9 | 0.0 | 0.0 | 0.0 | 0.0 |
| Ethane, lbmo/lhr | 0.0 | 0.0 | 0.0 | 21500.0 | 21500.0 | 17660.0 | 17660.0 |

TABLE 4-continued

Material Balance with Energy Consumption for Alternate Embodiment Employing Only External Cooling Utility

| | | | | | | | |
|---|---|---|---|---|---|---|---|
| Propane, lbmol/hr | | 0.0 | 4131.3 | 4131.3 | 0.0 | 0.0 | 0.0 | 0.0 |
| i-Butane, lbmol/hr | | 0.0 | 55.3 | 55.3 | 0.0 | 0.0 | 0.0 | 0.0 |
| n-Butane, lbmol/hr | | 0.0 | 17.4 | 17.4 | 0.0 | 0.0 | 0.0 | 0.0 |
| Total, lbmol/hr | | 6111.9 | 1.8 | 1.8 | 0.0 | 0.0 | 0.0 | 0.0 |
| | | | 2.2 | 2.2 | 0.0 | 0.0 | 0.0 | 0.0 |
| Temperature, °F. | | 204 | 4454.6 | 4454.6 | 21500.0 | 21500.0 | 17660.0 | 17660.0 |
| Pressure, psia | | 366 | | | | | | |
| Enthalpy, BTU/lbmol | | −122333 | 120 | 716 | 227 | 443 | 74 | 284 |
| Entropy, BTU/lbmol-°F. | | 16.8 | 512 | 502 | 754 | 724 | 61 | 56 |

TABLE 5

Material Balance with Energy Consumption for Alternate Embodiment Employing Only Cooling Water Utility

| Stream Number | 1 | 8 | 9 | 10 | 11 | 20 | 21 |
|---|---|---|---|---|---|---|---|
| Component Flow | | | | | | | |
| Hydrogen, lbmol/hr | 12571.0 | 12570.2 | 0.7 | 0.8 | 0.8 | 132 | 132 |
| Nitrogen, lbmol/hr | 46.3 | 46.3 | 0.0 | 0.0 | 0.0 | 39.7 | 39.7 |
| Carbon Monoxide, lbmol/hr, | 556.1 | 556.1 | 0.0 | 0.0 | 0.0 | 0.0 | 0.0 |
| Carbon Dioxide, lbmol-hr | 2783.0 | 2775.7 | 1.7 | 7.3 | 7.3 | 74.9 | 74.9 |
| Water, lbmol/hr | 6147.6 | 41.6 | 3061.7 | 6106.0 | 6106.0 | 0.0 | 0.0 |
| Methane, lbmol/hr | 1065.9 | 1065.9 | 0.0 | 0.0 | 0.0 | 4131.3 | 4131.3 |
| Ethane, lbmol/hr | 0.0 | 0.0 | 0.0 | 0.0 | 0.0 | 55.3 | 55.3 |
| Propane, lbmol/hr | 0.0 | 0.0 | 0.0 | 0.0 | 0.0 | 17.4 | 17.4 |
| i-Butane, lbmol/hr | 0.0 | 0.0 | 0.0 | 0.0 | 0.0 | 1.8 | 1.8 |
| n-Butane, lbmol/hr | 0.0 | 0.0 | 0.0 | 0.0 | 0.0 | 2.2 | 2.2 |
| Total, lbmol/hr | 23170.0 | 17055.9 | 3064.1 | 6114.1 | 6114.1 | 4454.6 | 4454.6 |
| Temperature, °F. | 753 | 98 | 290 | 204 | 204 | 120 | 716 |
| Pressure, psia | 373 | 366 | 367 | 366 | 366 | 512 | 502 |
| Enthalpy, BTU/lbmol | −45135 | −31249 | .118672 | −120355 | −120355 | .33291 | −26559 |
| Entropy, BTU/lbmol-°F. | 37.2 | 28.0 | 19.1 | 16.8 | 16.8 | 37.4 | 45.2 |
| Air Cooler Duty, BTU/hr | 0 | | | | | | |
| Air Cooler Fan Power, kW | 0 | | | | | | |
| Ambient Temperature, °F. | 90 | | | | | | |

| Stream Number | 30 | 31 | 40 | 41 | 50 | 51 |
|---|---|---|---|---|---|---|
| Component Flow | | | | | | |
| Hydrogen, lbmol/hr | 0.0 | 0.0 | 0.0 | 0.0 | 0.0 | 0.0 |
| Nitrogen, lbmol/hr | 0.0 | 0.0 | 0.0 | 0.0 | 0.0 | 0.0 |
| Carbon Monoxide, lbmol/hr, | 0.0 | 0.0 | 0.0 | 0.0 | 0.0 | 0.0 |
| Carbon Dioxide, lbmol-hr | 0.8 | 0.8 | 0.0 | 0.0 | 0.0 | 0.0 |
| Water, lbmol/hr | 21500.0 | 21500.0 | 17660.0 | 17660.0 | 148689.6 | 148689.6 |
| Methane, lbmol/hr | 0.0 | 0.0 | 0.0 | 0.0 | 0.0 | 0.0 |
| Ethane, lbmol/hr | 0.0 | 0.0 | 0.0 | 0.0 | 0.0 | 0.0 |
| Propane, lbmol/hr | 0.0 | 0.0 | 0.0 | 0.0 | 0.0 | 0.0 |
| i-Butane, lbmol/hr | 0.0 | 0.0 | 0.0 | 0.0 | 0.0 | 0.0 |
| n-Butane, lbmol/hr | 0.0 | 0.0 | 0.0 | 0.0 | 0.0 | 0.0 |
| Total, lbmol/hr | 21500.0 | 21500.0 | 17660.0 | 17660.0 | 148689.6 | 148689.6 |
| Temperature, °F. | 227 | 443 | 107 | 284 | 92 | 107 |
| Pressure, psia | 754 | 724 | 61 | 57 | 55 | 52 |
| Enthalpy, BTU/lbmol | −119865 | −115511 | −122144 | −118799 | −122422 | −122144 |
| Entropy, BTU/lbmol-°F. | 17.4 | 22.9 | 13.8 | 19.0 | 13.3 | 13.8 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for recovering energy from a hydrogen-bearing synthesis gas stream comprising:
   a. providing a first heat exchanger having at least four separate flow circuits;

b. supplying a first hot hydrogen-bearing synthesis gas stream to a first flow circuit of said first heat exchanger;

c. supplying a first cool heat exchange medium to a second flow circuit of said first heat exchanger whereby said hot hydrogen-bearing synthesis gas stream is cooled by indirect heat exchange with said first cool heat exchange medium;

d. feeding a second cool heat exchange medium to a third flow circuit of said first heat exchanger whereby said hot hydrogen-bearing synthesis gas stream is cooled by indirect heat exchange with said second cool heat exchange medium;

e. feeding a third cool heat exchange medium to a fourth flow circuit of said first heat exchanger whereby said hot hydrogen-bearing synthesis gas stream is cooled by indirect heat exchange with said third cool heat exchange medium; and f. removing cooled hydrogen-bearing synthesis gas stream from said heat exchanger;

wherein said first heat exchanger is divided into at least a first section and a second section; indirect heat exchange between the hot hydrogen-bearing synthesis gas stream and the second cool heat exchange medium is performed only in said first section of said first heat exchanger and indirect heat exchange between the hot hydrogen-bearing synthesis gas stream and the third cool heat exchange medium is performed only in said first section of said first heat exchanger and indirect heat exchange between the hot hydrogen-bearing synthesis gas stream and the first cool heat exchange medium is performed in both the first section and the second section of said first heat exchanger.

2. The process as claimed in claim 1, wherein said first hot hydrogen-bearing synthesis gas stream is obtained from process selected from the group consisting of a steam/hydrocarbon reforming process, a coal gasification process and a partial oxidation process.

3. The process as claimed in claim 2 wherein said first cool heat exchange medium is a hydrocarbon feed stream selected from the group consisting of a steam/hydrocarbon reforming process, a coal gasification process and a partial oxidation process.

4. The process as claimed in claim 1 wherein said first cool heat exchange medium is a hydrocarbon feed stream, said second cool heat exchange medium is a boiler water stream and said third cool heat exchange medium is a water stream of sufficient quality to produce steam for reforming reactions and export steam purity.

5. The process as claimed in claim 1 further comprising removing at least a portion of the hot hydrogen-bearing synthesis gas from said first heat exchanger; subjecting the hot hydrogen-bearing synthesis removed from said first heat exchanger to heat exchange in a second heat exchanger, and returning at least a portion of the resultant cooled hydrogen-bearing synthesis to said first heat exchanger for further cooling by indirect heat exchange.

6. The process as claimed in claim 1 wherein said first heat exchanger is selected from the group consisting of a spiral-wound tube heat exchanger, a plate-fin heat exchanger and a shell-tube heat exchanger.

7. The process as claimed in claim 1 wherein said hot hydrogen-bearing synthesis gas undergoes indirect heat exchange with more than one heat exchange medium at the same time.

8. The process as claimed in claim 1 further comprising: removing all or a portion of the hydrogen-bearing synthesis gas stream from said first section of said first heat exchanger; subjecting the hydrogen-bearing synthesis gas removed from said first section of said first heat exchanger to heat exchange in a second heat exchanger; removing the hydrogen-bearing synthesis gas from said second heat exchanger and introducing it into a gas/liquid separator, and removing uncondensed hydrogen-bearing synthesis gas stream from said gas/liquid separator and introducing it into said second section of said first heat exchanger.

9. The process as claimed in claim 1 further comprising:
removing at least a portion of the hot hydrogen-bearing synthesis gas stream from said first heat exchanger,
subjecting the hot hydrogen-bearing synthesis gas stream removed from said first heat exchanger to heat exchange in a second heat exchanger,
returning at least a portion of the resultant cooled hydrogen-bearing synthesis gas stream to said first heat exchanger for further cooling by indirect heat exchange, and
removing condensate, formed during the cooling of said first hot hydrogen-bearing synthesis gas stream in said second heat exchanger, from second heat exchanger.

10. The process as claimed in claim 1 wherein said hydrogen-bearing synthesis gas comprises 35 to 75 mol % hydrogen, 0 to 2 mol % nitrogen, 2 to 45 mol % carbon monoxide, 12 to 40 mol % carbon dioxide, 0 to 10 mol % hydrogen sulfide and less than 3 mol % $C_{+2}$ hydrocarbons.

11. The process as claimed in claim 1 wherein said hydrogen-bearing synthesis gas contains up to 11 mol % methane and up to 10 mol % hydrogen sulfide.

12. The process as claimed in claim 1 wherein said hydrogen-bearing synthesis gas is cooled from a temperature of 250° to 450° C. to a temperature of 30° to 50° C.

13. The process as claimed in claim 1 wherein said flow circuits defining the cooling portions of said heat exchanger are in a configuration selected from the group consisting of intertwined, alternated sequentially or in a pattern and overlapped.

14. A process for recovering energy from a hydrogen-bearing synthesis gas stream comprising:

a. providing a first heat exchanger having at least four separate flow circuits;

b. supplying a first hot hydrogen-bearing synthesis gas stream to a first flow circuit of said first heat exchanger;

c. supplying a first cool heat exchange medium to a second flow circuit of said first heat exchanger whereby said hot hydrogen-bearing synthesis gas stream is cooled by indirect heat exchange with said first cool heat exchange medium;

d. feeding a second cool, heat exchange medium to a third flow circuit of said first heat exchanger whereby said hot hydrogen-bearing synthesis gas stream is cooled by indirect heat exchange with said second cool heat exchange medium;

e. feeding a third cool heat exchange medium to a fourth flow circuit of said first heat exchanger whereby said hot hydrogen-bearing synthesis gas stream is cooled by indirect heat exchange with said third cool heat exchange medium; and f. removing cooled hydrogen-bearing synthesis gas stream from said heat exchanger;
wherein said first heat exchanger is divided into at least a first section and a second section and said process further comprising removing condensate, formed during the cooling of said first hot hydrogen-bearing synthesis gas stream, from said first section and said second section;

wherein the process further comprises:
removing at least a portion of the hot hydrogen-bearing synthesis from said first section of said first heat exchanger,
subjecting the hot hydrogen-bearing synthesis removed from said first section of said first heat exchanger to heat exchange in a second heat exchanger,
returning at least a portion of the resultant cooled hydrogen-bearing synthesis to said first heat exchanger for further cooling by indirect heat exchange, and removing condensate, formed during the cooling of said first hot hydrogen-bearing synthesis gas stream in said second heat exchanger, from second heat exchanger.

15. The process as claimed in claim 14 wherein in said first section of said first heat exchanger, indirect heat exchange is performed between the hot hydrogen-bearing synthesis gas stream and the second cool heat exchange medium, and between the hot hydrogen-bearing synthesis gas stream and the third cool heat exchange medium.

16. The process as claimed in claim 14 wherein indirect heat exchange between the hot hydrogen-bearing synthesis gas stream and the first cool heat exchange medium is performed in both the first section and the second section of said first heat exchanger.

17. The process as claimed in claim 14 wherein said first hot hydrogen-bearing synthesis gas stream is obtained from process selected from the group consisting of a steam/hydrocarbon reforming process, a coal gasification process and a partial oxidation process.

18. The process as claimed in claim 17 wherein said first cool heat exchange medium is a hydrocarbon feed stream selected from the group consisting of a steam/hydrocarbon reforming process, a coal gasification process and a partial oxidation process.

19. The process as claimed in claim 14 wherein said first cool heat exchange medium is a hydrocarbon feed stream, said second cool heat exchange medium is a boiler water stream and said third cool heat exchange medium is a water stream of sufficient quality to produce steam for reforming reactions and export steam purity.

20. The process as claimed in claim 14 wherein said first heat exchanger is selected from the group consisting of a spiral-wound tube heat exchanger, a plate-fin heat exchanger and a shell-tube heat exchanger.

21. The process as claimed in claim 14 wherein said hot hydrogen-bearing synthesis gas undergoes indirect heat exchange with more than one heat exchange medium at the same time.

22. The process as claimed in claim 14 further comprising: removing all or a portion of the hydrogen-bearing synthesis gas stream from said first section of said first heat exchanger; subjecting the hydrogen-bearing synthesis gas removed from said first section of said first heat exchanger to heat exchange in a second heat exchanger; removing the hydrogen-bearing synthesis gas from said second heat exchanger and introducing it into a gas/liquid separator, and removing uncondensed hydrogen-bearing synthesis gas stream from said gas/liquid separator and introducing it into said second section of said first heat exchanger.

23. The process as claimed in claim 14 further comprising: removing the hydrogen-bearing synthesis gas from said second heat exchanger and introducing it into a gas/liquid separator; removing uncondensed hydrogen-bearing synthesis gas stream from said gas/liquid separator and introducing it into a third heat exchanger; and removing hydrogen-bearing synthesis gas from said third heat exchanger and introducing it into a second gas/liquid separator, from which cooled product hydrogen-bearing synthesis gas is removed.

24. The process as claimed in claim 14 wherein said hydrogen-bearing synthesis gas comprises 35 to 75 mol % hydrogen, 0 to 2 mol % nitrogen, 2 to 45 mol % carbon monoxide, 12 to 40 mol % carbon dioxide, 0 to 10 mol % hydrogen sulfide and less than 3 mol % $C_{+2}$ hydrocarbons.

25. The process as claimed in claim 14 wherein said hydrogen-bearing synthesis gas contains up to 11 mol % methane and up to 10 mol % hydrogen sulfide.

26. The process as claimed in claim 14 wherein said hydrogen-bearing synthesis gas is cooled from a temperature of 250° to 450° C. to a temperature of 30° to 50° C.

27. The process as claimed in claim 14 wherein said flow circuits defining the cooling portions of said heat exchanger are in a configuration selected from the group consisting of intertwined, alternated sequentially or in a pattern and overlapped.

* * * * *